United States Patent [19]

Gardner et al.

[11] Patent Number: 4,828,683
[45] Date of Patent: May 9, 1989

[54] HYDROFINING EMPLOYING A SUPPORT MATERIAL FOR FIXED BEDS

[75] Inventors: Lloyd E. Gardner; Simon G. Kukes, both of Bartlesville, Okla.

[73] Assignee: Phillips Petroleum Company, Bartlesville, Okla.

[21] Appl. No.: 11,989

[22] Filed: Feb. 6, 1987

[51] Int. Cl.$^4$ .............................................. C10G 45/04
[52] U.S. Cl. .................... 208/216 R; 208/213; 208/216 PP; 208/251 H; 208/254 H
[58] Field of Search ............... 208/251 H, 213, 216 R, 208/254 H; 502/8, 10

[56] References Cited

U.S. PATENT DOCUMENTS

| | | | |
|---|---|---|---|
| 2,438,450 | 3/1948 | Nelson | 502/10 |
| 2,443,462 | 6/1945 | Kimberlin, Jr. et al. | 502/10 |
| 2,666,749 | 1/1954 | Hoekstra | 502/8 |
| 2,703,315 | 3/1955 | Murray et al. | 502/8 |
| 2,865,866 | 12/1958 | Hoekstra | 502/10 |
| 2,890,162 | 6/1959 | Anderson, Jr. et al. | 208/46 |
| 2,987,470 | 6/1961 | Turken | 208/253 |
| 3,041,271 | 6/1962 | Anderson | 502/8 |
| 3,169,827 | 2/1965 | de Rosset | 208/213 |
| 3,278,421 | 10/1966 | Gatsis | 208/264 |
| 3,340,180 | 9/1967 | Beuther et al. | 208/251 H |
| 3,362,901 | 1/1968 | Szepe et al. | 208/86 |
| 3,365,389 | 1/1968 | Spars et al. | 208/59 |
| 3,530,066 | 9/1970 | Kuwata et al. | 208/213 |
| 3,725,531 | 4/1973 | Pearson et al. | 423/244 |
| 3,867,281 | 2/1975 | Morgun et al. | 208/213 |
| 3,891,541 | 6/1975 | Oleek et al. | 208/251 H |
| 3,898,155 | 8/1975 | Wilson | 208/251 H |
| 3,901,792 | 8/1975 | Wolk et al. | 208/210 |
| 3,920,540 | 11/1975 | McCoy et al. | 208/213 |
| 3,977,961 | 8/1976 | Hamner | 208/59 |
| 4,016,067 | 4/1977 | Fischer et al. | 208/251 H |
| 4,019,978 | 4/1977 | Miller et al. | 208/213 |
| 4,039,430 | 8/1977 | Jensen | 208/213 |
| 4,105,587 | 8/1978 | Blakely | 208/251 H |
| 4,115,248 | 9/1978 | Mulaskey | 208/212 |
| 4,188,284 | 2/1980 | Quick et al. | 208/251 H |
| 4,272,357 | 6/1981 | Rollman | 208/251 H |
| 4,297,242 | 10/1981 | Hensley, Jr. et al. | 252/439 |
| 4,374,020 | 2/1983 | Trevino et al. | 208/143 |
| 4,407,735 | 10/1983 | Savamura | 502/10 |
| 4,411,771 | 10/1983 | Bambrick et al. | 208/212 |
| 4,422,960 | 12/1983 | Shiroto et al. | 502/206 |
| 4,437,980 | 3/1984 | Heredy et al. | 208/251 H |
| 4,444,655 | 4/1984 | Shiroto et al. | 208/210 |
| 4,492,626 | 1/1985 | Kukes | 208/251 H |
| 4,552,650 | 11/1985 | Tonlhont et al. | 208/251 H |
| 4,560,466 | 12/1985 | Kukes et al. | 208/251 H |
| 4,564,441 | 1/1986 | Kukes et al. | 208/108 |
| 4,568,664 | 2/1986 | Goodboy | 502/330 |
| 4,572,778 | 2/1986 | War | 208/251 H |
| 4,584,093 | 4/1986 | Toulhart et al. | 208/251 H |
| 4,587,012 | 5/1986 | Quann | 208/251 H |
| 4,628,040 | 12/1986 | Green et al. | 502/8 |

FOREIGN PATENT DOCUMENTS

| | | | |
|---|---|---|---|
| 54976 | 6/1982 | European Pat. Off. | 502/10 |
| 1117955 | 9/1963 | Japan | 502/10 |

OTHER PUBLICATIONS

Product Data—S-100 Activated Alumina for Claus Catalysis, Alcoa Chemical Division, Aug. 1984.
Technical Bulletins SC: 175-80 and SC: 462-80, Shell Chemical Company, 1980, Sep.
Technical Data—Actispheres: Protection Upper Layer, Procatalyse, 1985, Jan.

*Primary Examiner*—H. M. S. Sneed
*Assistant Examiner*—Helane Myers
*Attorney, Agent, or Firm*—K. K. Brandes

[57] ABSTRACT

A hydrotreating process comprises contacting a substantially liquid hydrocarbon-containing feed stream, which contains compounds of sulfur and metals (preferably Ni and/or V), in the presence of a fixed catalyst bed comprising at least one layer of substantially spherical alumina-containing particles which have been prepared by heating a specific starting material at about 500°–900° C. for improved crush strength retention. In a preferred embodiment, the fixed catalyst bed further comprises at least one layer (b) of catalyst particles comprising a refractory inorganic carrier and at least one hydrogenation promoter. A fixed catalyst bed comprising layers (a) and (b) is provided.

41 Claims, 4 Drawing Sheets

HYDROFINING EMPLOYING A SUPPORT MATERIAL FOR FIXED BEDS

BACKGROUND OF THE INVENTION

This invention relates to a process for hydrotreating hydrocarbon-containing oils, which also contain sulfur and metal impurities, in the presence of a fixed bed comprising at least one layer of substantially spherical alumina-containing particles. In another aspect, this invention relates to the use of said at least one layer of substantially spherical alumina-containing particles as support layer in a fixed catalyst bed. In a further aspect, this invention relates to a process for catalytically hydrotreating hydrocarbon-containing oils in the presence of water. In still another aspect, this invention relates to a fixed multi-layer hydrotreating catalyst bed system comprising at least one layer of substantially spherical alumina-containing particles.

Fixed beds of hydrotreating catalysts are used in many oil refineries. Examples of processes in which fixed hydrotreating (hydrofining) catalyst beds are used include hydrodenitrogenation hydrodesulfurization and hydrodemetallization of heavy oils. Generally, a layer of shaped, substantially inert ceramic particles at the bottom of the fixed bed reactor is used to support a column of one or more layers of hydrotreating catalyst. The same shaped, substantially inert material can also be employed as the top layer (i.e., above one or more layers of hydrotreating catalyst) or between layers of hydrotreating catalyst, so as to provide improved flow dispersion of feed oil passing downwardly through the fixed catalyst bed. More recently, promoted alumina spheres, which offer some catalytic activity, have been suggested as replacement for these substantially inert ceramic support particles. However, there is one ever present need to develop improved substantially spherical alumina-containing support particles having higher crush strength and higher resistance to specific feed components, such as water, than those presently known, so as to employ these improved alumina-containing support particles under very severe hydrotreating conditions.

SUMMARY OF THE INVENTION

It is an object of this invention to provide a process for hydrotreating substantially liquid hydrocarbon-containing feed streams in a multi-layer fixed catalyst bed. It is another object of this invention to employ in said hydrotreating process a fixed catalyst bed comprising at least one layer of substantially spherical alumina-containing particles having high crush strength retention. It is a further object of this invention to provide a process for hydrotreating substantially liquid hydrocarbon-containing feed streams in the presence of water and a fixed catalyst bed comprising a bottom-layer (support layer) and/or a top layer and/or interlayers of substantially spherical alumina-containing particles having high crush strength retention. It is still another object of this invention to provide a mutli-layer catalyst system comprising at least one layer of substantially spherical alumina-containing particles having high crush strength retention (when exposed to oil and water under hydrotreating conditions). Further objects and advantages will be apparent from the detailed description and the appended claims.

In accordance with this invention, a hydrotreating process comprises the step of contacting a substantially liquid (i.e., liquid at the hydrotreating conditions) hydrocarbon-containing feed stream, which also contains compounds of sulfur and metals, with a free hydrogen containing gas in the presence of a fixed catalyst bed comprising (a) at least one layer of substantially spherical alumina-containing particles, under such hydrotreating conditions as to obtain at least one liquid hydrocarbon-containing product stream having lower concentrations of sulfur and metals than said hydrocarbon-containing feed stream;

wherein said substantially spherical alumina-containing particles in catalyst layer (a) have been prepared by a process comprising the step of heating a starting material of substantially spherical alumina-containing particles having an initial average particle size (diameter) of about 0.05 to about 1.5 inches, an initial surface area (determined by the BET/$N_2$ method; ASTM D3037) of at least about 20 $m^2$/g, an initial pore volume (determined by mercury intrusion porosimetry at a pressure ranging from 0 to 50,000 psig) of at least about 0.1 cc/g, an initial normalized crush strength (side plate crush strength) of at least 150 lb. per inch diameter per particle, an initial Na content of less than about 2.0 weight-% and an initial content of $Al_2O_3$ of at least about 80 weight-%, said heating of said starting material being carried out at a temperature in the range of from about 500° to about 900° C. for a period of time of at least 10 minutes, preferably for a period of time in the range of about 10 minutes to about 20 hours, under such heating conditions as to increase the portion of the pore volume in pores having a diameter of about 40–200 Angstroms (to preferably at least about 50% of the total pore volume), and to increase the retention of crush strength (measured after exposure for about 100 hours to a liquid hydrocarbon-containing stream which contains at least about 0.5 weight-% sulfur, under hydrotreating conditions at about 2250 psig total pressure, about 110 psig partial pressure of steam and about 700° F.).

In one preferred embodiment, said metals in said liquid hydrocarbon-containing feed stream comprise at least one of nickel and vanadium, preferably about 3–500 ppmw Ni and about 5–1,000 ppmw V (ppmw=parts per million parts of feed stream). In another preferred embodiment, said substantially liquid hydrocarbon-containing feed stream also contains water (preferably about 0.5–10 volume-%). In a further preferred embodiment, steam is injected into one fixed catalyst bed during said contacting under hydrotreating conditions.

In a particularly preferred embodiment, said catalyst bed additionally comprises (b) at least one layer of catalyst particles [i.e., hydrotreating catalyst particles; different from the particles in layer (a)] comprising a refractory inorganic carrier (preferably alumina) and at least one (i.e., one or a mixture of two or more) hydrogenation promoter selected from the group consisting of transition metals of Groups IIIB, IVB, VB, VIB, VIIB, VIII, IB and IIB of the Periodic Table (as defined in Webster's New Collegiate Dictionary, 1977) and compounds of these metals (preferably Y, La, Ce, Ti, Zr, Cr, Mo, W, Mn, Re, Ni, Co and Cu). The most preferred hydrogenation promoters include oxides and/or sulfides of Mo, Co, Ni and mixtures of two or more of these compounds. In addition, one or more compounds of phosphorus can also be present in these catalyst particles.

Also in accordance with this invention, a catalyst bed (preferably hydrotreating catalyst bed) is provided comprising (a) at least one layer of preferably substantially spherical alumina-containing particles and (b) a layer of catalyst particles [preferably hydrotreating catalyst particles; different from the particles in layer (a)] comprising a refractory inorganic carrier material and a hydrogenation promoter, as defined above in the description of the hydrotreating process of this invention;

wherein said shaped alumina-containing particles (a) have been prepared according to the procedure described above in the description of the hydrotreating process of this invention.

In one preferred embodiment, said substantially spherical alumina-containing particles in catalyst layer (a) also contain at least one compound of at least one element selected from the group consisting of Y, La, Ce, Ti, Zr, Cr, Mo, W, Mn, Re, Ni, Co, Cu, Zn and P, preferably oxide and/or sulfide of Mo (more preferably containing about 0.1–2.0 weight-% Mo) as hydrotreating promoters. In a more preferred embodiment, said initial alumina-containing starting material has been impregnated with a solution containing at least one compound of at least one of the elements listed immediately above before said heating of said starting material (as described in the above description of the hydrotreating process of this invention).

In a further preferred embodiment, said at least one layer (a) is located as support layer below said at least one catalyst layer (b). In a still further preferred embodiment, said at least one layer (a) is located on top of said at least one catalyst layer (b). In still another embodiment, one layer (a) is located below said catalyst layer (b) and another catalyst layer (a) is located above said catalyst layer (b). These configurations of catalyst bed layers described immediately above are preferably employed in the hydrotreating process of this invention.

DETAILED DESCRIPTION OF THE INVENTION (A) Hydrotreating Process

Any suitable hydrocarbon-containing feed stream, which is substantially liquid at the hydrotreating conditions and contains compounds of metals (in particular nickel and/or vanadium) and sulfur as impurities, can be employed in the hydrotreating process of this invention. Generally these feed streams also contain coke precursors (measured as Ramsbottom carbon) and nitrogen compounds as impurities. Suitable hydrocarbon-containing feed streams include crude oil (crude petroleum) and heavy fraction thereof, heavy oil extracts, liquid coal pyrolyzates, liquid products from coal liquification, liquid extracts and liquid pyrolyzates from tar sands, shale oil and heavy shale oil fractions. The process of this invention is particularly suited for treating heavy crudes and heavy petroleum residua, which generally have an initial boiling point (at atmospheric pressure) in excess of about 400° F., preferably in excess of about 600° F. These heavy oil feeds generally contain at least about 5 ppmw (parts by weight per million by weight of hydrocarbon-containing feed) vanadium (preferably 5–1000 ppmw V), at least about 3 ppmw Ni (preferably about 3–500 ppmw Ni), at least about 0.5 weight-% sulfur (preferably about 0.5–5.0 weight-% S), about 0.2–2.0 weight-% nitrogen, and about 1–20 weight-% Ramsbottom carbon residue (determined by ASTM D524). The $API_{60}$ gravity (measured at 60° F.) of these feeds is generally about 5–30 (preferably about 8–25).

The substantially liquid hydrocarbon-containing feed stream can be substantially free of water but can, in a preferred embodiment, also contain at least about 0.3 weight-% water, generally about 0.3 to about 20 weight-% $H_2O$, preferably about 0.5 to about 10 weight-% $H_2O$, more preferably about 1.0 to about 5.0 weight-% $H_2O$. Water can be residual water which has not been removed from heavy crude oil, or water can be added as liquid water to the hydrocarbon-containing feed stream prior to its contact with the fixed catalyst bed, or water can be added as steam to the hydrocarbon-containing feed stream prior to its contact with the fixed catalyst bed, or water can be added as steam concurrently with the hydrocarbon-containing feed stream prior to its contact with the fixed catalyst bed. Some oil refineries use steam in this manner to alleviate coke deposition in the fixed catalyst bed and thus retard fouling and deactivation of the fixed catalyst bed. The hydrotreating process of this invention is particularly suited for feed streams that contain water because the alumina-containing particles in layer (a), in accordance with this invention, are particularly resistant to the detrimental effect of water during hydrotreating.

The hydrotreating process of this invention can be carried out in any apparatus whereby an intimate contact of the fixed hydrotreating catalyst bed with said hydrocarbon-containing feed stream and a free hydrogen containing gas is achieved, under such conditions as to produce a hydrocarbon-containing product having reduced levels of metals (in particular Ni and V) and sulfur. Generally, a lower level of nitrogen and Ramsbottom carbon residue and higher API gravity are also attained in this hydrotreating process. The hydrotreating process of this invention can be carried out as a batch process or, preferably, as a continuous down-flow process, more preferably in a tubular reactor containing one or more fixed catalyst beds (as will be described later) or in a plurality of fixed bed reactors in parallel or in series. The hydrocarbon-containing product stream can be distilled, e.g., in a fractional distillation unit, so as to obtain fractions having different boiling ranges.

Any suitable reaction time (contact time) between the fixed catalyst bed, the hydrocarbon-containing feed stream, the hydrogen-containing gas and, optionally, steam can be utilized. In general, the reaction time will be in the range of from about 0.05 hours to about 10 hours, preferably from about 0.4 to about 5 hours. In a continuous fixed bed operation, this generally requires a liquid hourly space velocity (LHSV) in the range of from about 0.10 to about 10 cc of feed per cc of catalyst per hour, preferably from about 0.2 to about 2.5 cc/cc/hr.

The hydrotreating process employing the fixed catalyst bed of the present invention can be carried out at any suitable temperature. The reaction temperature will generally be in the range of about 250° C. to about 550° C. and will preferably be in the range of about 300° C. to about 450° C. Higher temperatures do improve the removal of impurities but temperatures which will have adverse effects on the hydrocarbon containing feed stream, such as excessive coking, will usually be avoided. Also, economic considerations will usually be taken into account in selecting the operating temperature.

Any suitable pressure may be utilized in the hydrotreating process. The reaction pressure will generally be in the range from of about atmospheric pressure (0 psig) to up to 5,000 psig. Preferably, the pressure will be in the range of from about 100 to about 2500 psig. Higher pressures tend to reduce coke formation, but operating at high pressure may be undesirable for safety and economic reasons.

Any suitable quantity of free hydrogen can be added to the hydrotreating process. The quantity of hydrogen used to contact the hydrocarbon containing feed stream will generally be in the range of from about 100 to about 10,000 standard cubic feet $H_2$ per barrel of hydrocarbon containing feed stream and will more preferably be in the range of from about 1,000 to about 5,000 standard cubic feed $H_2$ per barrel of the hydrocarbon containing feed stream. Either pure hydrogen or a free hydrogen containing gas mixture (e.g., $H_2$ and $CH_4$, or $H_2$ and CO, or $H_2$ and $N_2$) can be used.

If desired, the hydrotreating process of this invention may comprise the step of adding at least one added thermally decomposable metal compound into the hydrocarbon-containing feed stream prior to its being contacted with the catalyst composition of this invention. The metal in the added thermally decomposable metal compound is selected from compounds of metals of Group IIIB, IVB, VIB, VIIB, VIII, IB and IIB of the Periodic Table (as defined above). Preferred metals are molybdenum, tungsten, manganese, chromium, zirconium and zinc. Molybdenum is a particularly preferred metal which may be introduced as a carbonyl, acetate, acetylacetonate, carboxylate (e.g., octoate), naphthenate, mercaptide, dithiophosphate or dithiocarbamate. Molybdenum hexacarbonyl, molybdenum dithiophosphate and molybdenum dithiocarbamate are particularly preferred additives. The life of the catalyst composition and the efficiency of the demetallization process is improved by introducing at least one of the above-cited decomposable metal compounds into the hydrocarbon containing feed, which also contains metals such as nickel and vanadium. These additives can be added continuously or intermittently and are preferably added at a time when the catalyst composition of this invention has been partially deactivated so as to extend its life. Any suitable concentration of the additive may be added to the hydrocarbon containing feed stream to result in a concentration of the metal (preferably molybdenum) of said decomposable compounds in the range of from about 1 to about 1,000 parts per million by weight and more preferably in the range of about 5 to about 100 parts per million in said feed stream.

At least a portion of the hydrotreated product stream which has been produced in the process of this invention can subsequently be cracked, e.g., in a fluidized catalytic cracking unit, employing zeolite- or clay-containing cracking catalyst, under such conditions as to produce lower boiling hydrocarbon materials, such as gasoline and kerosene, suitable for use as fuels and other useful products. It is within the scope of this invention to hydrotreat the product stream having reduced contents of metals and sulfur in a second hydrotreating process using a different fixed catalyst bed, such as zinc titanate-supported $Ni/MoO_3$ catalysts, for further removal of sulfur and other impurities (e.g., metals) before the product stream is introduced into a cracking reactor and treating under cracking conditions.

(B) Fixed Catalyst Bed

The fixed, solid catalyst bed of this invention comprises (a) at least one layer (i.e., one layer or a plurality of layers) of spherical catalyst particles comprising alumina, said particles having been prepared by a process comprising the steps of heating a suitable starting material under suitable heating conditions, so as to obtain a product having a specific set of properties, as have been described above. Any suitable substantially spherical alumina containing particles which have the following initial parameters can be used as said starting material: average particle size (diameter) in the range of from about 0.05 to about 1.5 inches, preferably from about 0.1 to about 0.5 inches; surface area (determined by the $BET/N_2$ method; ASTM D3037) of at least about 20 $m^2/g$, preferably in the range of from about 40 to about 600 $m^2/g$, more preferably in the range of from 100 to about 400 $m^2/g$; a pore volume, as determined by mercury intrusion porosimetry (carried out at room temperature and a mercury pressure varying from 0 psi to about 60,000 psi, using an Autopore 9200 instrument of Micromeritics, Norcross, GA), of at least about 0.1 cc/g, preferably in the range of from about 0.2 to about 1.0 cc/g. more preferably from about 0.3 to about 0.7 cc/g; a normalized crush strength per particle, determined as side plate crush strength by means of a mechanical force gauge, such the one described in Example I, of at least 150 lb. per inch diameter per particle preferably in the range of from about 150 to about 350 lb. per inch diameter per particle; Na content of less than about 2.0 weight-%, preferably in the range of from about 0.1 to about 1.0 weight-% Na; content of alumina, which generally is a mixture of gamma-alumina and amorphous alumina, of at least about 80 weight-% $Al_2O_3$, preferably in the range of from about 90 to about 99 weight-% $Al_2O_3$, more preferably from about 93 to about 98 weight-% $Al_2O_3$. A presently particularly preferred starting material is a commercially available spherical, alumina-containing Claus catalyst material that is marketed by the Aluminum Company of America, Pittsburgh, PA under the product designation of S-100 (see Example II).

The substantially spherical alumina-containing starting material is heated at a temperature in the range of from about 500° to about 900° C., preferably from about 550° to about 800° C., more preferably from about 600° to about 750° C. The heating time is at least 10 minutes, preferably in the range from about 10 minutes to 20 hours, more preferably from about 0.5 to about 10 hours. The pressure can be atmospheric (preferred) or subatmospheric or superatmospheric. The heating process can be carried out in a free oxygen containing gas atmosphere such as air (presently preferred) or in an inert or reducing gas atmosphere. The gas atmosphere may contain water vapor, but the amount of water vapor should be minimized to less than about 10 volume percent.

Generally the above-described heating of the spherical, alumina-containing starting material results in a tolerable decrease in surface area, in a insignificant increase in total pore volume, but in a substantial increase in pores having a pore diameter in the 40–200 Angstrom (A) range. Preferably, the substantially spherical alumina-containing particles in catalyst layer (a), obtained by the heating process as described above, have a pore volume of pores in the 40–200 A pore diameter range in excess of about 50%, more preferably from about 50 to about 90% of the total pore volume. Preferably, the total BET/$N_2$ surface area of the substantially spherical particles in layer (a) is in the range of from about 50 to about 300 $m^2/g$, and the total pore volume (determined by mercury porosimetry, discussed above) is in the range of from about 0.3 to about 0.8 cc/g.

The crush strength of the substantially spherical alumina-containing particles is preferably measured after they have been used in a hydrotreating process in the presence of water, as has been described above and in Example I, so as to determine the retention of initial crush strength under these severe hydrotreating conditions (about 2250 psi total pressure, about 110 psi partial pressure of steam, 700° F., 100 hours; with at least about 0.5 weight-% sulfur in the hydrocarbon-containing feed). The thus determined crush strength generally exceeds 150 lb. per inch diameter per particle and preferably is in the range of about 150 to about 350 lb./inch/particle.

The dimensions of catalyst bed layer (a) comprising the substantially spherical alumina-containing particles obtained by the above-described heating process are not critical and depend on the dimension of the hydrotreating reactor that holds the fixed catalyst bed. Generally the height of each layer (a) ranges from about 1 to about 50 feet in commercial hydrotreating operations. It is within the scope of this invention to have additionally inert particles present (up to 50 weight-%) in layer (a), such as inert ceramic particles, in particular Denstone D-57 (described in Example I).

The substantially spherical alumina-containing particles in layer (a) can be promoted with at least one element or compound at least one element (i.e., one or mixture of two or more) selected from the group consisting of Y, La, Ce, Ti, Zr, Hf, Cr, Mo, W, Mn, Re, Ni, Co, Cu, Zn, P (as phosphite and/or phosphate), preferably Mo, Ni and Co, more preferably Mo. The total promoter level preferably is relatively low and generally ranges from about 0.01 to about 3.0 weight-% of said at least one element, preferably from about 0.1 to about 2.0 weight-%, more preferably from about 0.2 to about 1.0 weight-% of said at least one element (most preferably Mo).

Any suitable technique for promoting the particles in layer (a) can be employed, such as soaking of the spherical alumina-containing particles with a solution (generally aqueous) containing one or more promoter compounds (including phosphorus compounds such as $H_3PO_4$ and/or $H_3PO_3$ and/or $NH_4$ salts thereof), and subsequent drying and calcining (this method being presently preferred); or spraying of a solution onto the spherical alumina-containing particles, followed by drying and calcining; or mulling of the spherical alumina-containing particles with promoter compounds, followed by calcining. Generally the crush strength of the substantially spherical alumina-containing particles is not substantially affected by the presence of one or more promoters.

In a preferred embodiment of this invention the fixed catalyst bed comprises at least one layer (a), as described above, and at least one layer (b) of catalyst particles different from those in layer (a). The catalyst particles in layer (b) generally comprise an inorganic refractory carrier. Non-limiting examples of such inorganic refractory carrier materials are those that comprise (preferably consist essentially of) alumina (preferred), aluminum phosphate, silica, titania, zirconia, zirconium phosphate, ceria, boria, magnesia, silica-alumina, titania-silica, titania-alumina. In addition to the carriers, the particles in catalyst bed layer (b) comprise at least one promoter selected from compounds of metals of Groups IIIB, IVB, VB, VIB, VIIB, VIII, IB and IIB of the Periodic Table. Presently preferred promoters are compounds of metals selected from the group consisting of Y, La, Ce, Ti, Zr, Cr, Mo, W, Mn, Re, Ni, Co and Cu, more preferably oxides and/or sulfides of these metals, most preferably Mo, Ni, Co, and mixtures of any of these metal oxides and sulfides. Phosphorus compounds of these metals can also be present. Generally the total level of promoter ranges from about 0.5 to about 30 weight-%, preferably from about 1 to about 15 weight-%, based on the elemental metal. Generally the BET/$N_2$ surface area of the particles in layer (b) is in the range of from about 50 to about 500 $m^2/g$, and their pore volume (measured by mercury porosimetry) is in the range of from about 0.2 to about 2.0 cc/g.

The catalyst particles in layer (b) can be prepared by any suitable technique such as contacting of the carrier (preferably alumina) with one or more solutions containing one or more compounds of the promoter metals (plus, optionally, one or more compounds of phosphorus) and subsequent drying and calcining (this method presently being preferred) as has been described for promoted particles in layer (a); or by coprecipitation e.g., of hydrogels of alumina and promoter metal (e.g., Ni, Co, Mo), followed by drying and calcining suitable commercially available catalyst materials for layer (b) as described in Example I.

Figure 1:
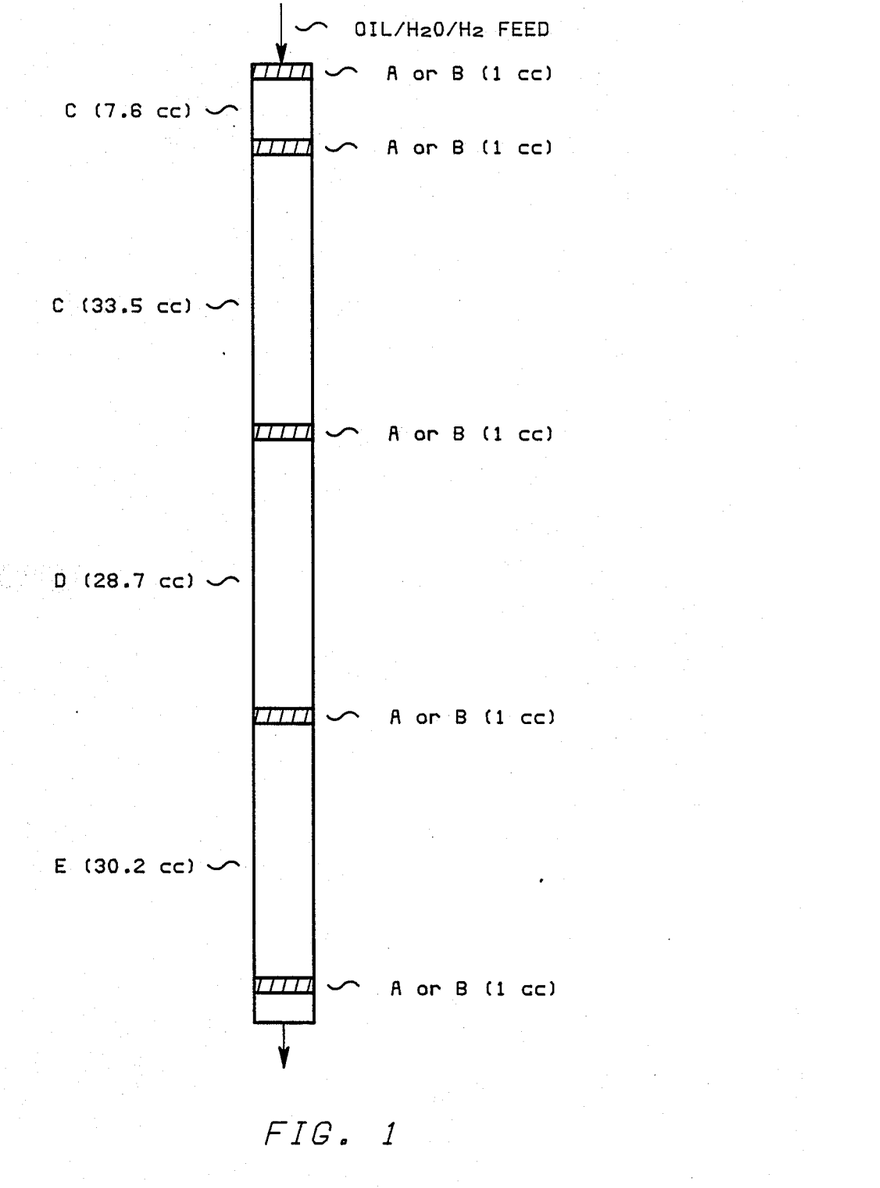
FIG. 1 shows the arrangement of a fixed multi-layer catalyst bed used for testing catalysts in hydrotreating processes.

Layers (a) and (b) can be arranged in the fixed catalyst bed of this invention in any suitable manner. In one preferred embodiment layer (a) is placed as support layer below at least one catalyst layer (b). In another embodiment, layer (a) is placed as a cover layer on top of at least catalyst layer (b). In a further embodiment, layer (a) is placed between at least two catalyst layers (b). In a still further embodiment, in which at least three layers (a) and at least two catalyst layers (b) (which are different from each other) are employed, one layer (a) is placed on top of said at least two catalyst layers (b), one layer (a) is placed as interlayer between two different catalyst layers (b), and a third layer (a) is placed below said at least two lower catalyst layer (b). Another suitable catalyst bed arrangement is shown in FIG. I. The weight ratio of each catalyst layer (a) to each catalyst layer (b) is generally in the range of from about 1:100 to about 1:1, preferably from about 1:20 to about 1:5.

If desired, the fixed catalyst bed of this invention can be sulfided by treatment with a fluid stream that contains sulfur compounds, generally prior to said hydrotreating process. Non-limiting examples of such fluid streams are solutions of mercaptans, mercaptoalcohols, organic sulfides and organic disulfides in a suitable organic solvent (such as gas oil and other petroleum fractions), and gas streams that comprise $H_2S$, such as mixtures of $H_2$ and $H_2S$. This sulfiding procedure is generally carried out at an elevated temperature (preferably at about 400°–700° F.) for a period of time sufficient (preferably from about 0.5–20 hours) so as to convert at least a portion of any compounds of one or more metals contained in particles of layer (b), and optionally also in particles of layer (a), to sulfides of said one or more metals.

In general, the fixed catalyst bed of this invention is utilized primarily for demetallization and desulfurization. The time in which the fixed catalyst bed of this invention will maintain its activity for the above process will depend upon the hydrotreating conditions and the composition of the hydrocarbon-containing feed. Generally, the temperature of the hydrotreating process is gradually increased to compensate for loss of catalyst activity due to fouling (e.g., due to deposition of coke and metals as the catalyst). The entire fixed catalyst bed or one or more layers of the fixed catalyst bed can, if desired, be regenerated when the catalytic activity has dropped below a desired level. Catalyst regeneration can be carried in-situ by discontinuing the flow of hydrogen and of the hydrocarbon-containing feed streams, purging the fixed bed reactor with an inert gas (e.g., $N_2$), and then heating the fixed catalyst bed in a free oxygen-containing gas atmosphere (such as air), under such conditions as to remove carbonaceous materials and to at least partially convert sulfides of transition metals such as Mo, Co and/or Ni back to their oxides and/or phosphates. Preferably, however, the fixed bed layers are removed from the cooled hydrotreating reactor after said purging and are transferred to another reactor where the catalyst regeneration takes place. Generally the catalyst regeneration step is carried out at about 400°–600° C. and at a pressure of about 0–1,000 psig.

The following examples are presented in further illustration of the invention and are not to be considered as unduly limiting the scope of this invention.

EXAMPLE I

This example illustrates the evaluation of catalyst bed support particles in oil hydrotreating tests, in the presence of steam. The purpose of this evaluation procedure is to determine the hydrodemetallization activity and the retention of crush strength of these support particles under severe hydrotreating conditions, in the presence of steam.

The catalyst bed arrangement (simulating proportions of a typical refinery bed loading) which was used in the evaluation tests is shown in FIG. 1. The catalyst bed column had a diameter of about 0.75 inches. Particles A were substantially spherical alumina-containing particles, which are described in more detail in Example II. Particles A can be particles A1, A2, A3 or A4. Particles B were commercially available, substantially inert ceramic bed support particles, marketed as Denstone D-57 by Norton Company, Worcester, MA. Material C was a commercial alumina-supported hydrotreating catalyst comprising 0.9 weight-% Co, 0.5 weight-% Ni and 7.5 weight-% Mo, having a BET/$N_2$ surface area of 174 $m^2/g$ and a pore volume of 0.63 cc/g (measured by mercury intrusion porosimetry). Material D was a commercial alumina-based hydrotreating catalyst comprising 3.1 weight-% Ni, 7.9 weight-% Mo and 4.6 weight-% Ti having a BET/N surface area of 140 $m^2/g$ and a pore volume (by Hg intrusion porosimetry) of 0.5 cc/g. Material E was a commercial alumina-based hydrotreating catalyst comprising 2.4 weight-% Co and 6.7 weight-% Mo, having a BET/$N_2$ surface area of 290 $m^2/g$ and pore volume (by Hg intrusion porosimetry) of 0.47 cc/g.

A heavy oil-water mixture containing about 4–8 volume-% $H_2O$ was pumped to a metallic mixing T-pipe where it was mixed with a controlled amount of hydrogen gas. The heavy oil was a Maya 400F+ resid having an $API^{60}$ gravity of 14.0, containing 3.8 weight-% sulfur and about 350 ppmw (Ni+V) (parts by weight of Ni+V per million parts by weight of oil feed). The oil/water/hydrogen mixture was pumped downward through a stainless steel trickle bed reactor which contained the multi-layer catalyst bed described above (see FIG. I). The tubular reactor was about 28.5 inches long, had an inner diameter of about 0.75 inches, and was fitted inside with a 0.25 inch O.D. axial thermocouple well. The reactor was heated by a 3-zone furnace. The reactor temperature was usually measured in four locations along the reactor bed by a traveling thermocouple that was moved within the axial thermocouple well.

Generally, the hydrotreating conditions were as follows: reaction temperature of about 690°–720° F.; liquid hourly space velocity (LHSV) of about 0.3 cc/cc catalyst/hour; about 2,250 psig total pressure; about 110 psig $H_2O$ (steam) partial pressure (note: in some tests the steam pressure was varied so as to study the effect of steam pressure on crush strength); time on stream: about 100 hours (note: in some tests the hydrotreating time was varied to study its effect on crush strength). When it was desired to determine the desulfurization and demetallization activity of the catalyst bed, the liquid product was filtered through a glass filter and analyzed for sulfur, nickel and vanadium by plasma emission analysis.

After completion of the hydrotreating test, the reactor with catalyst bed was flushed with xylene so as to remove undrained oil. Thereafter, nitrogen gas was passed through the xylene-washed catalyst bed so as to dry it. The various catalyst layers were carefully removed. Particles A, B or C were tested for crush strength in a Mechanic Force Gauge D-75M of Hunter Spring, Division oF Ametek, Hot Field, PA. A single sphere of A or B or C, the average diameter of which had been measured, was placed between the metal plates of D-75M, and the plates were slowly moved toward one another by means of an electric motor. The force applied to the plates was displayed by a gauge. The force necessary to fracture (crush) a catalyst sphere was recorded as the crush strength of the sphere. The normalized crush strength, defined as crush strength of a sphere divided by its average particle diameter (lb/sphere/inch diameter), was calculated.

EXAMPLE II

This example illustrates the preparation of the substantially spherical alumina particles of this invention and their differences versus other catalyst bed support particles.

Control Particles A1 were spherical, Co/Mo-promoted alumina particles, marketed by Shell Chemical Company, Houston, TX under the product designation "Shell 544", suitable as support balls for hydrotreating catalyst beds. Pertinent properties particles of A1 were: diameter of 1/6 inch; cobalt content of 1.7 weight-%; molybdenum content of 5.3 weight-%; surface area of 300+ $m^2/g$; total pore volume of 0.47 cc/g; loss on ignition (LOI; weight loss when heated to 482° C.) of 0.8 weight-%; compacted bulk density (compacted loading density) of about 0.83 g/cc; and side plate crush strength of 30+ lb/particle (i.e., about 190 lb/particle/inch diameter).

Control Particles A2 were substantially spherical, substantially unpromoted alumina-containing particles having an average particle diameter of 1/16 and ⅛ inch, respectively; a BET/$N_2$ surface area of about 325 $m^2/g$; a total pore volume of about 0.50 $m^2/g$; and average normalized individual ball crush strength of about 240 lb/particle/inch diameter (i.e., the actual crush strength of a ¼" sphere was about 60 lb/particle); $Al_2O_3$ content of about 94.6 weight-%; $Na_2O$ content of about 0.35 weight-%; and LOI content (weight loss when heated from 250° C. to 1200° C.; a measure of hydroxyl content) of 5.0 weight-%. Particles A2 are marketed by Aluminum Company of America, Pittsburgh, PA under the product designation of S-100.

Invention Particles A3 were obtained when control particles $A_2$ were heated at a temperature in the range of from about 550° C. to about 800° C. for a period of time in the range of from about 10 minutes to several hours.

Invention Particles A4 were obtained when control particle $A_2$ were first impregnated with an aqueous solution containing ammonium molybdate, $(NH4)_2MoO_4$, at such concentration and a weight proportion of particles and solution as to provide a promoter level of about 0.1–3.0 weight-% Mo in the particles (after calcining); drying the thus impregnated particles, and then calcining them at a temperature of from about 550° C. to about 800° C. for a period of time in the range of from about 10 minutes to several hours.

The pore volume distribution of invention Particles $A_3$ was compared with that of control Particles $A_2$ and $A_2$. Pore volume and pore diameter of these particles were determined by measuring intrusion porosimetry (carried out at room temperature at a mercury ranging from 0 psi to 60,000 psi, using an Autopore 9200 instrument of Micromeritics, Norcross, GA).

Figure 2:
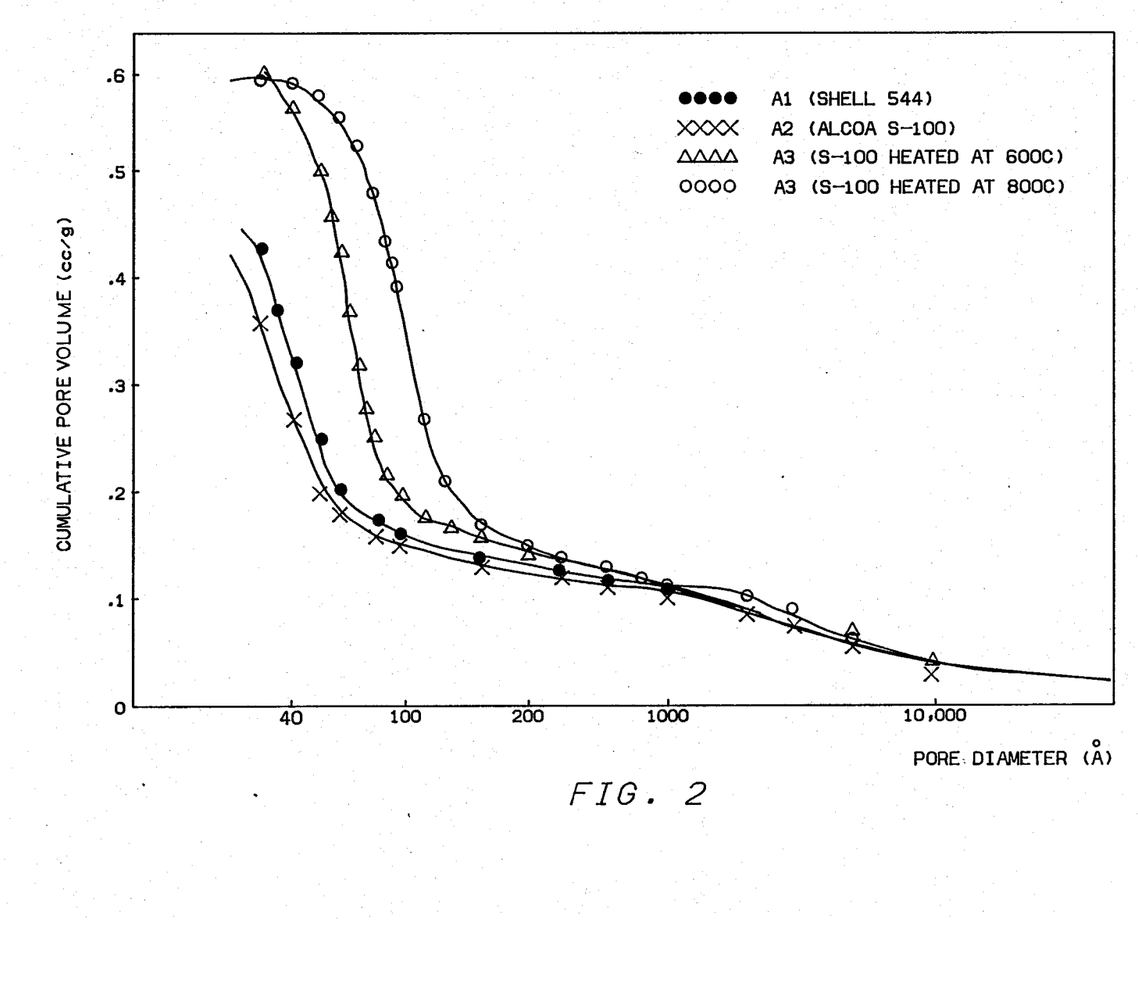
FIG. 2 shows pore distribution curves for various alumina-containing particles.

In FIG. 2, pore volume was plotted versus logarithm of pore diameter for A1, A2 and two A3 samples. FIG. 2 shows that A1 (Shell 544, as received; 1/6" diameter) and of A2 (Alcoa S-100, as received; 1/16" diameter) had very similar pore distributions, whereas the pore distributions of the two A3 samples (obtained by heating 1/16" A2 particles at 600° C. and 800° C., respectively, for about 3 hours, differed significantly from those of A1 and A2. The most signficant changes that resulted when A2 (S-100) particles were heated to 600° C. and 800° C., respectively, (so as to make A3 particles in accordance with this invention) was a shift toward a substantially greater portion of pores in the 40–200 A pore diameter range. About 80% of the total pore volume of A3 was in pores of the 40–200 Angstrom range, whereas the percentage of the total pore volume of A1 and A2 in the 40–200 Angstrom pore diameter range was only about 40%.

EXAMPLE III

This example illustrates the effect of the heating (calcination) conditions on pertinent physical properties of the invention particles A3 and A4. A2 particles of about ⅛ inch diameter that had been impregnated with about 0.3 weight-% Mo were heated in air at temperatures ranging from 400° C. to 900° C. for about 1 hour. The crush strength of the thus calcined particles (diameter: ⅛ inch) were determined in accordance with the procedure described in Example I. Test results are summarized in Table I and are plotted in FIG. 3.

TABLE I

| Run | Calcination Temp. (°C.) | Crush Strength (lb/Particle) | Normalized Crush Strength (lb/Inch Diameter) |
|---|---|---|---|
| 1 (Control) | 400 | 1.88 | 15.0 |
| 2 (Control) | 500 | 3.42 | 27.4 |
| 3 (Invention) | 600 | 4.37 | 35.0 |
| 4 (Invention) | 700 | 4.80 | 38.4 |
| 5 (Invention) | 800 | 3.95 | 31.6 |
| 6 (Control) | 900 | 1.65 | 13.2 |

Figure 3:
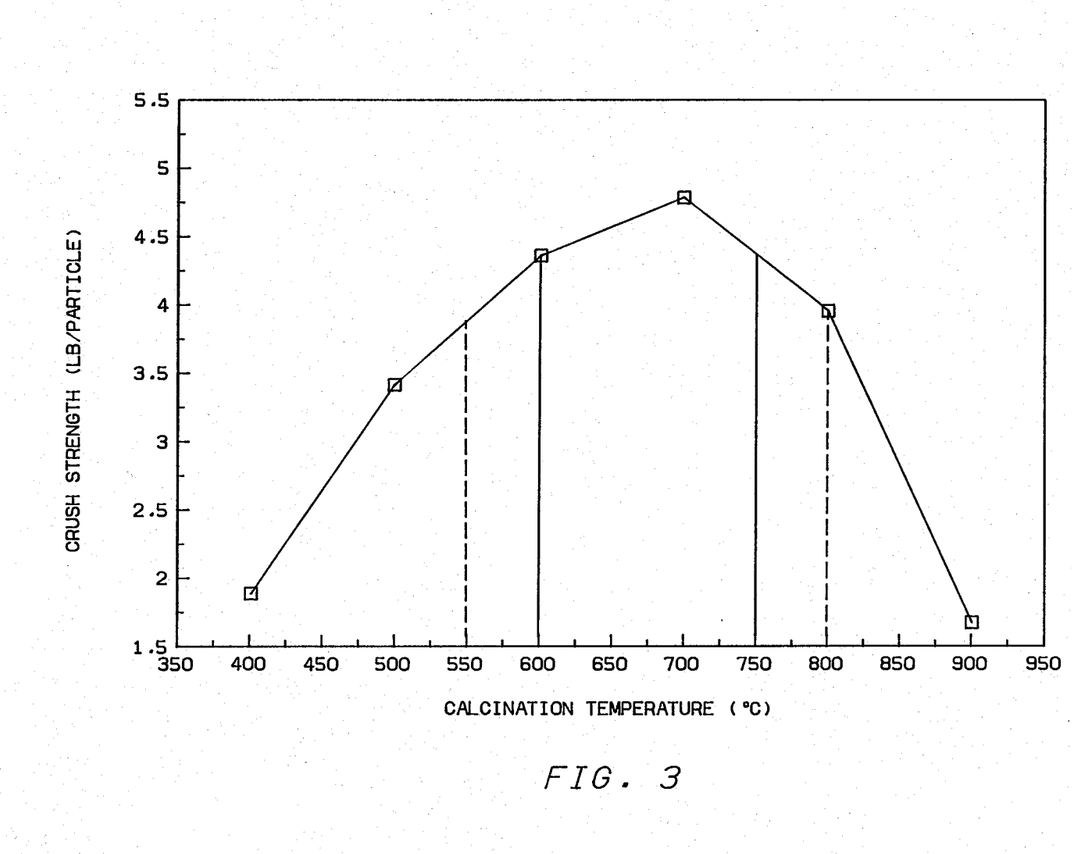
FIG. 3 is a graph showing the dependence of crush strength of alumina-containing particles on the calcination temperature.

Data in Table I and FIG. 3 clearly show that maximum crush strength (after hydrotreating in the presence of steam) was attained when the alumina spheres (containing 0.3 weight-% Mo) were calcined at a temperature in the range of from about 550° to about 800° C., preferably from about 600° to about 750° C.

The effect of the calcination time, at a calcination temperature of 650° C., is shown in Table II.

TABLE II

| Run 1 | Calcination Time (minutes) | Crush Strength (lb/Particle) | Normalized Crush Strength (lb/Inch Diameter) |
|---|---|---|---|
| 7 | 20 | 7.01 | 56.1 |
| 8 | 40 | 7.25 | 58.0 |
| 9 | 60 | 7.20 | 57.6 |
| 10 | 90 | 6.68 | 53.4 |
| 11 | 120 | 6.41 | 51.3 |
| 12 | 240 | 5.22 | 41.8 |

Data in Table II shows that a calcination time of about 20–90 minutes was suitable for ⅛ inch diameter alumina-containing particles A4. Prolonged calcining had a detrimental effect.

The total pore volume of the Mo-impregnated alumina spheres used in Runs 7–12 ranged from about 0.5 to about 0.6 cc/g when the calcination was carried out for 16 hours at a temperature in the range of from about 400° C. to about 800° C. Thus, the effect of the calcination temperature on the total pore volume of the calcined spheres was rather insignificant. On the other hand, the pore size distribution was significantly affected by the calcination temperature as, has been shown in FIG. 2.

EXAMPLE IV

This example illustrates the improved performance of the invention particles A4 (with 0.3 weight-% Mo) in prolonged hydrotreating tests versus control particles A1, A2 and C. Crush strength results, obtained subtantially in accordance with the hydrotreating procedure described in Example I, are summarized in Table III. Hydrotreating conditions were: 2200 psig total pressure; 760° F.; 100 psi steam pressure, LHSV of 0.1 cc/cc catalyst/hour. The resid feed contained about 2.0 weight-% sulfur and about 60 ppmw (Ni+V)

TABLE III

| | | Hours on Stream: | | | | | |
|---|---|---|---|---|---|---|---|
| | | 0 | 16 | 30 | 140 | 270 | 360 |
| Run | Particles[1] | Crush Strength (lb/Particle) | | | | | |
| 13 (Control) | 1/6" A1 | 35 | 11 | N/A | N/A | N/A | N/A |

TABLE III-continued

| Run | Particles[1] | 0 | 16 | 30 | 140 | 270 | 360 |
|---|---|---|---|---|---|---|---|
| | | Hours on Stream: | | | | | |
| | | Crush Strength (lb/Particle) | | | | | |
| 14 (Control) | ¼" A2 | 58 | 11 | N/A | N/A | N/A | N/A |
| 15 (Invent.) | ¼" A4 | 55 | 39 | 37 | 34 | 38 | 38 |
| 16 (Invent.) | ⅛" A4 | 100+ | 80+ | 80+ | 80+ | 80+ | 80+ |
| 17 (Control) | ⅛" B | 49 | N/A | 42 | N/A | N/A | N/A |

[1]Fractions indicate particle diameter expressed in inches.

Test data in Table III clearly show a significant improvement in crush strength retention of invention particles A4 over control particles A1 and A2, after use in the several hydrotreating runs in the presence of steam, as described in Example I. The crush strength retention of A5 under these conditions was comparable to that of inert ceramic particles B (commercial Denstone particles, described in Example II).

EXAMPLE V

In this example, the hydrotreating activity of invention particles A4 is compared with that of control particles B (Denstone). Hydrotreating conditions were: 700° F.; LHSV of 0.3 cc/cc catalyst/hour; 2250 psig total pressure; hydrogen addition of 3500 SCF $H_2$ per barrel of oil; essentially no water was present. The heavy oil feed contained 16.3 ppmw Ni, 31.4 ppmw V, 1.76 weight-% S, and 14.0 weight-% Ramsbottom carbon residue; $API^{60}$ gravity was 15.2. Test results, summarized in Table IV, were averaged after about 7-10 days on stream when about 15 weight-% metals (Ni+V) had been deposited on the catalysts contained in the catalyst bed, which was arranged as shown in FIG. I. In Run 18, invention particles A4 (particle diameter: ⅛ inch) were employed in the five layers of 1 cc volume, as shown in FIG. 1. In Run 19, control particles B were used in these five layers.

TABLE IV

| Particles in Interlayers | Run 18 (Invention) A4 | Run 19 (Control) B |
|---|---|---|
| % Removal of (Ni + V) | 74 | 69 |
| % Removal of S | 80 | 78 |
| % Removal of Ramsbottom Carbon Residue | 70 | 66 |
| $API^{60}$ Gravity of Product | 20.7 | 20.2 |

Data in Table IV clearly show that the multi-layered catalyst bed (see FIG. 1) containing invention particles A4 in the five layers of 1 cc volume was noticeable more efficient in removing Ni+V, sulfur and Ramsbottom carbon residue from the heavy oil than the catalyst bed with substantially inert particles B (Denstone) in these five layers.

Figure 4:
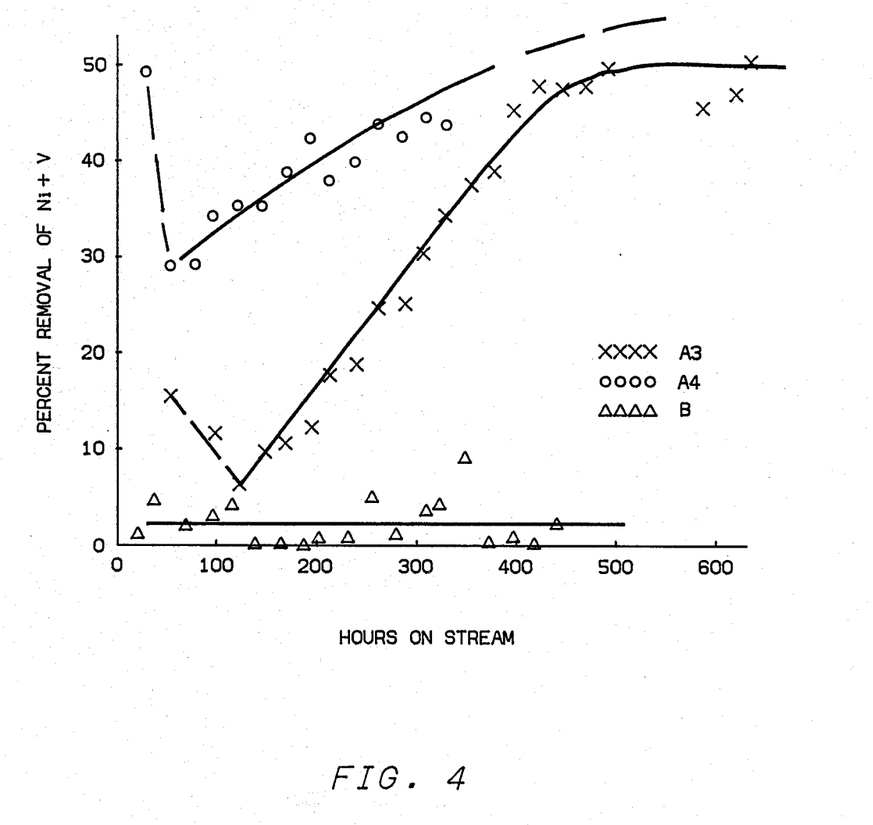
FIG. 4 shows hydrodemetallization activity curves for three different catalyst bed support materials.

In another test series, A3, A4 and C, each of ⅛ inch diameter, were used in a single layer catalyst bed (no C, D and E were present) and were used for hydrodemetalization of a heavy resid containing about 400 ppmw (Ni+V), at a LHSV of 0.5 cc/cc catalyst/hour, total pressure of 2250 psig, and a temperature of 750° F. (no steam was present). Results are summarized in FIG. 4, which indicates the substantial hydrometalization superiority of invention particles A3 and A4 over control particles B, especially after about 400 hours in stream.

That which is claimed:

1. A hydrotreating process comprising the step of contacting a substantially liquid hydrocarbon-containing heavy oil feed stream, which also contains compounds of sulfur and metals, with a free hydrogen containing gas in the presence of a fixed catalyst bed comprising
   (a) at least one layer of substantially spherical alumina-containing particles, and
   (b) at least one layer of hydrotreating catalyst particles comprising a refractory inorganic carrier material and at least one hydrogenation promoter selected from the group consisting of transition metals belonging to Groups IIIB, IVB, VB, VIB, VIIB, VIII, IB and IIB of the Periodic Table and compounds of said transition metals,
   in the presence of water and under such hydrotreating conditions as to obtain at least one liquid hydrocarbon-containing product stream having lower concentrations of sulfur and metals than said hydrocarbon-containing heavy oil feed stream;
   wherein said substantially spherical alumina-containing particles in layer (a) have been prepared by a process comprising the step of heating a starting material of substantially spherical alumina-containing particles having an initial average particle size in the range of from about 0.05 to about 1.5 inches, an initial surface area, determined by the BET/$N_2$ method, of at least about 20 m²/g, an initial pore volume, determined by mercury intrusion porosimetry at a pressure ranging from 0 to 50,000 psig, of at least about 0.1 cc/g, an initial normalized crush strength of at least 150 lb. per inch diameter per particle, an initial content of Na of less than about 2.0 weight-%, and an initial content of $Al_2O_3$ of at least about 80 weight-%,
   said heating of said starting material being carried out at a temperature in the range of from about 500° to about 900° C. for a period of time of at least 10 minutes, under such heating conditions as to increase the portion of the pore volume in pores having a diameter in the range of from about 40 to about 200 Angstroms and to increase the retention of crush strength, measured after exposure for about 100 hours to a liquid hydrocarbon-containing stream which contains at least about 0.5 weight-% sulfur, under hydrotreating conditions at about 2250 psig total pressure, about 110 psig partial pressure of steam and about 700° F.;
   wherein a layer (a) of said substantially spherical alumina-containing particles is placed as support layer below at least one layer (b) of said hydrotreating catalyst particles;
   wherein said substantially spherical alumina-containing particles in said support layer are promoted with at least one compound of at least one element selected from the group consisting of Y, La, Ce, Ti, Zr, Hf, Cr, Mo, W, Mn, Re, Ni, Co, Cu, Zn and P at a level of from about 0.1 to about 2.0 weight percent of said at least one element;
   and wherein said hydrotreating catalyst particles contain said at least one hydrogenation promoter at a level which is effective for lowering the concentration of sulfur and metals present in said hydrocarbon-containing feed stream under said hydrotreating conditions.

2. A process in accordance with claim 1, wherein said compounds of metals in said hydrocarbon-containing heavy oil feed stream comprise compounds of at least one metal selected from the group consisting of nickel and vanadium.

3. A process in accordance with claim 1, wherein said hydrocarbon-containing heavy oil feed stream comprises about 3-500 ppmw Ni and about 5-1000 1 ppmw V.

4. A process in accordance with claim 3, wherein said hydrocarbon-containing heavy oil feed further contains about 0.5-5.0 weight-% sulfur and about 1-20 weight-% Ramsbottom carbon residue, and has $API_{60}$ gravity of about 5-30.

5. A process in accordance with claim 1, wherein said hydrocarbon-containing heavy oil feed stream contains from about 0.3 to about 20 weight-% water.

6. A process in accordance with claim 1, wherein said hydrocarbon-containing heavy oil feed stream contains from about 0.5 to about 10 weight-% water.

7. A process in accordance with claim 1, wherein said starting material has an initial average particle size in the range of from about 0.1 to about 0.5 inches, an initial surface area in the range of from about 40 to about 600 m²/g, an initial pore volume in the range of from about 0.2 to about 1.0 cc/g, and an initial normalized crush strength in the range of from about 150 to about 350 lb. per inch diameter per particle.

8. A process in accordance with claim 7, wherein said initial content of Na is in the range of from about 0.1 to about 1.0 weight, and said initial content of $Al_2O_3$ is in the range of from about 90 to about 99 weight-%.

9. A process in accordance with claim 1, wherein said heating of said starting material is carried out at a temperature in the range of from about 550° to about 800° C. for a period of time in the range of from about 10 minutes to about 20 hours.

10. A process in accordance with claim 1, wherein said substantially spherical alumina-containing particles in layer (a) have a pore volume of pores having a diameter of about 40-200 Angstroms in the range of from 50% to about 90% of the total pore volume, and a crush strength in the range of from about 150 to about 350 lb. per inch diameter per particle.

11. A process in accordance with claim 10, wherein said substantially spherical alumina-containing particles in layer (a) have a surface area in the range of from about 50 to about 300 m²/g and a pore volume in the range of from about 0.3 to about 0.8 g.

12. A process in accordance with claim 1, wherein said at least one element is selected from the group consisting of Mo, Ni and Co.

13. A process in accordance with claim 1, wherein said refractory inorganic carrier comprises alumina, and said at least one hydrogenation promoter is selected from the group consisting of compounds of Y, La, Ce, Ti, Zr, Cr, Mo, W, Mn, Re, Ni, Co and Cu.

14. A process in accordance with claim 1, wherein said hydrotreating catalyst particles in layer (b) comprise alumina as carrier material and at least one hydrogenation promoter selected from the group consisting of oxides and sulfides of Mo, oxides and sulfides of Ni, oxides and sulfides of Co, and mixtures thereof, have a surface area in the range of from about 50 to about 500 m²/g, and have a pore volume in the range of from about 0.2 to about 2.0 cc/g.

15. A process in accordance with claim 1, wherein another layer (a) of substantially spherical alumina-containing particles is placed on top of at least one layer (b) of hydrotreating catalyst particles.

16. A process in accordance with claim 1, wherein said fixed catalyst bed comprises at least three layers (a) of substantially spherical alumina-containing particles and at least two layers (b) of hydrotreating catalyst particles; and wherein one layer (a) is placed on top of said at least two layers (b), one layer (a) is placed below said at least two layers (b), and one layer (a) is placed between two layers (b).

17. A process in accordance with claim 1, wherein the weight ratio of each layer (a) of substantially spherical alumina-containing particles to each layer (b) of hydrotreating catalyst particles is in the range of from about 1:100 to about 1:1.

18. A process in accordance with claim 1, wherein said hydrotreating conditions comprise a reaction time in the range of from about 0.05 to about 10 hours, a reaction temperature in the range of from about 250° to about 550° C., a reaction pressure in the range of from about 0 to about 5,000 psig, and a quantity of added hydrogen gas in the range of from about 100 to about 10,000 cubic feet of $H_2$ per barrel of hydrocarbon-containing heavy oil feed stream.

19. A process in accordance with claim 18, wherein said hydrotreating conditions comprise a reaction time in the range of from about 0.4 to about 5 hours, a reaction temperature in the range of from about 300° to about 450° C., a reaction pressure in the range of from about 100 to about 2,500 psig, and a quantity of added hydrogen in the range of from about 1,000 to about 5,000 cubic feet of $H_2$ per barrel of hydrocarbon-containing heavy oil feed stream.

20. A process in accordance with claim 1, wherein said hydrocarbon-containing heavy oil feed stream contains at least one added thermally decomposable compound selected from the group consisting of compounds of metals belonging to Groups IIIB, IVB, VB, VIB, VIIB, VIII, IB and IIB of the Periodic Table.

21. A process in accordance with claim 20, wherein said at least one added thermally decomposable compound is selected from the group consisting of molybdenum compounds, tungsten compounds, manganese compounds, chromium compounds, zirconium compounds and zinc compounds.

22. A process in accordance with claim 1 wherein the $API_{60}$ gravity of said hydrocarbon-containing heavy oil feed stream is about 8-25.

23. A process in accordance with claim 5 wherein said water is introduced as steam.

24. A process in accordance with claim 12, wherein said at least element is molybdenum and is present at a level of about 0.2-1.0 weight-%.

25. A hydrotreating process comprising the step of contacting a substantially liquid hydrocarbon-containing feed stream, which also contains compounds of sulfur and metals, with a free hydrogen containing gas in the presence of a fixed catalyst bed comprising
  (a) at least one layer of impregnated, substantially spherical alumina-containing particles and
  (b) at least one layer of hydrotreating catalyst particles comprising a refractory inorganic carrier material and at least one hydrogenation promoter selected from the group consisting of transition metals belonging to Groups IIIB, IVB, VB, VIB, VIIB, VIII, IB and IIB of the Periodic Table and compounds of said transition metals,
  in the presence of water and under such hydrotreating conditions as to obtain at least one liquid hydrocarbon-containing product stream having lower concentrations of sulfur and metals than said hydrocarbon-containing heavy oil feed stream;

wherein said substantially spherical alumina-containing particles in layer (a) have been prepared by a process comprising the step of heating a starting material of substantially spherical alumina-containing particles haviing an initial average particle size in the range of from about 0.05 to about 1.5 inches, an initial surface area, determined by the BET/$N_2$ method, of at least about 20 $m^2/g$, an initial pore volume, determined by mercury intrusion porosimetry at a pressure ranging from 0 to 50,000 psig, of at least about 0.1 cc/g, an initial normalized crush strength of at least 150 lb. per inch diameter per particle, an initial content of Na of less than about 2.0 weight-%, and an initial content of $Al_2O_3$ of at least about 80 weight-%, said heating of said starting material being carried out at a temperature in the range of from about 500° to about 900° C. for a period of time of at least 10 minutes, under such heating conditions as to increase the portion of the pore volume in pores having a diameter in the range of from about 40 to about 200 Angstroms and to increase the retention of crush strength, measured after exposure for about 100 hours to a liquid hydrocarbon-containing stream which contains at least about 0.5 weight-% sulfur, under hydrotreating conditions at about 2250 psig total pressure, about 110 psig partial pressure of steam and about 700° F.;

wherein a layer (a) of said substantially spherical alumina-containing particles is placed as support layer below at least one layer (b) of said hydrotreating catalyst particles;

wherein said substantially spherical alumina-containing particles in said support layer consist essentially of alumina;

and wherein said hydrotreating catalyst particles contain said at least one hydrogenation promoter at a level which is effective for lowering the concentration of sulfur and metals present in said hydrocarbon-containing feed stream under said hydrotreating conditions.

26. A process in accordance with claim 25, wherein said compounds of metals in said hydrocarbon-containing heavy oil feed stream comprise compounds of at least one metal selected from the group consisting of nickel and vanadium.

27. A process in accordance with claim 25, wherein said hydrocarbon-containing heavy oil feed stream comprises about 3–500 ppmw Ni, about 5–1000 ppmw V and about 0.5–5.0 weight-% sulfur, and has $API_{60}$ gravity of about 8–25.

28. A process in accordance with claim 25, wherein said hydrocarbon-containing feed stream contains from about 0.3 to about 20 weight-% water.

29. A process in accordance with claim 25, wherein said starting material has an initial average particle size in the range of from about 0.1 to about 0.5 inches, an initial surface area in the range of from about 40 to about 600 $m^2g$, an initial pore volume in the range of from about 0.2 to about 1.0 cc/g, and an initial normalized crush strength in the range of from about 150 to about 350 lb. per inch diameter per particle.

30. A process in accordance with claim 25, wherein said heating of said starting material is carried out at a temperature in the range of from about 550° to about 800° C. for a period of time in the range of from about 10 minutes to about 20 hours.

31. A process in accordance with claim 25, wherein said substantially spherical alumina-containing particles in layer (a) have a pore volume of pores having a diameter of about 40-200 Angstroms in the range of from 50% to about 90% of the total pore volume, and a crush strength in the range of from about 150 to about 350 lb. per inch diameter per particle.

32. A process in accordance with claim 25, wherein said refractory inorganic carrier of said hydrotreating catalyst particles comprises alumina, and said at least one hydrogenation promoter is selected from the group consisting of compounds of Y, La, Ce, Ti, Zr, Cr, Mo, W, Mn, Re, Ni, Co and Cu.

33. A process in accordance with claim 25, wherein said hydrotreating catalyst particles in layer (b) comprise alumina as carrier material and at least one hydrogenation promoter selected from the group consisting of oxides and sulfides of Mo, oxides and sulfides of Ni, oxides and sulfides of Co, and mixture thereof, have a surface area in the range of from about 50 to about 500 $m^2/g$, and have a pore volume in the range of from about 0.2 to about 2.0 cc/g.

34. A process in accordance with claim 25, wherein another layer (a) of substantially spherical alumina-containing particles is placed on top of at least one layer (b) of hydrotreating catalyst particles.

35. A process in accordance with claim 25, wherein said fixed catalyst bed comprises at least three layers (a) of substantially spherical alumina-containing particles and at least two layers (b) of hydrotreating catalyst particles; and wherein one layer (a) is placed on top of said at least two layers (b), one layer (a) is placed below said at least two layers (b), and one layer (a) is placed between two layers (b).

36. A process in accordance with claim 25, wherein the weight ratio of each layer (a) of substantially spherical alumina-containing particles to each layer (b) of hydrotreating catalyst particles is in the range of from about 1:100 to about 1:1.

37. A process in accordance with claim 25, wherein said hydrotreating conditions comprise a reaction time in the range of from about 0.05 to about 10 hours, a reaction temperature in the range of from about 250° to about 550° C., a reaction pressure in the range of from about 0 to about 5,000 psig, and a quantity of added hydrogen gas in the range of from about 100 to about 10,000 cubic feet of $H_2$ per barrel of hydrocarbon-containing heavy oil feed stream.

38. A process in accordance with claim 37, wherein said hydrotreating conditions comprise a reaction time in the range of from about 0.4 to about 5 hours, a reaction temperature in the range of from about 300° to about 450° C., a reaction pressure in the range of from about 100 to about 2,500 psig, and a quantity of added hydrogen in the range of from about 1,000 to about 5,000 cubic feet of $H_2$ per barrel of hydrocarbon-containing heavy oil feed stream.

39. A process in accordance with claim 25, wherein said hydrocarbon-containing heavy oil feed stream contains at least one added thermally decomposable compound selected from the group consisting of compounds of metals belonging to Groups IIIB, IVB, VB, VIB, VIIB, VIII, IB and IIB of the Periodic Table.

40. A process in accordance with claim 39, wherein said at least one added thermally decomposable compound is selected from the group consisting of molybdenum compounds, tungsten compounds, manganese compounds, chromium compounds, zirconium compounds and zinc compounds.

41. A process in accordance with claim 25, wherein said water has been introduced as steam.

* * * * *